April 2, 1946.  A. W. BORSUM  2,397,527
REMOTE INDICATOR
Filed July 27, 1942
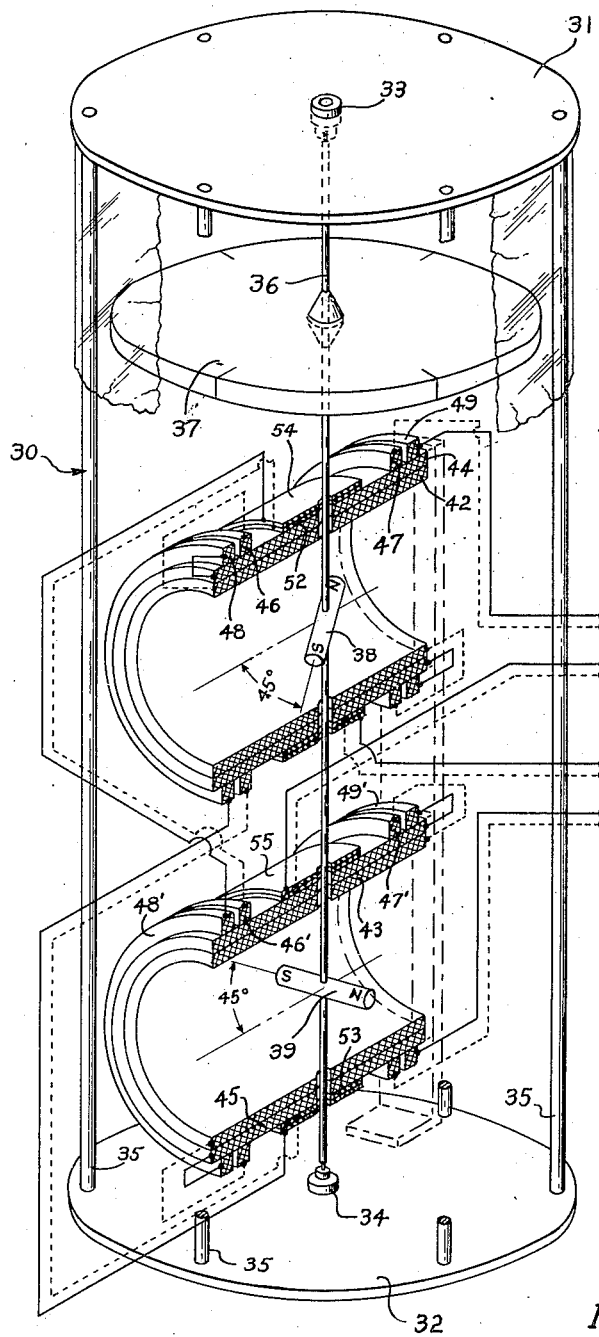
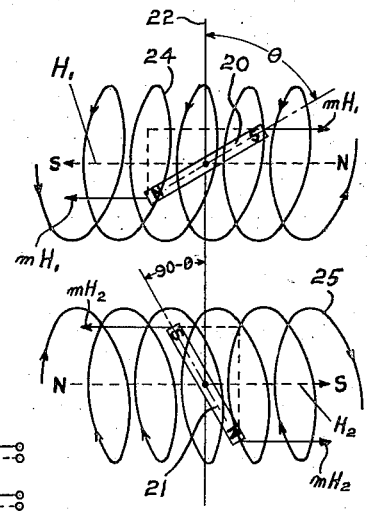
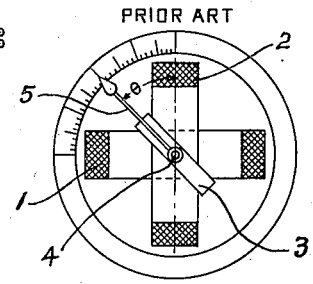
INVENTOR
Adolph W Borsum
BY
ATTORNEY Patented Apr. 2, 1946

2,397,527

UNITED STATES PATENT OFFICE 2,397,527

REMOTE INDICATOR

Adolph W. Borsum, United States Navy

Application July 27, 1942, Serial No. 452,545

6 Claims. (Cl. 171—95)

(Granted under the act of March 3, 1883, as amended April 30, 1928; 370 O. G. 757)

This invention relates to indicating instruments, particularly to a repeater for an indicating instrument adapted to accurately reproduce the reading thereof at a point remote from the location of said instrument. The type of instrument disclosed is adapted specifically for use as a repeater of magnetic directions and is designed for use in combination with the compass transmitter of a type described and claimed in my copending application, Serial No. 423,359, filed December 17, 1941.

It is often necessary to have the readings of various types of indicating instruments, particularly direction indicating instruments, repeated or reproduced at a point which is remote from the location of said instrument. Numerous expedients have been utilized heretofore for repeating remotely the readings of said instruments. The repeater of my invention is similar in function to the electromagnetically actuated remote indicator of the prior art. However, the repeater of this invention is believed to offer the advantages over prior art repeaters of increased torque and increased accuracy at the same time retaining the advantages of simplicity in manufacture and design.

It is an object of this invention to provide a remote indicator of the electromagnetic type which is extremely accurate in its indications.

In the prior art devices of the type illustrated in the accompanying drawing, the magnetic fields producing the torque actuating the movable element of the remote indicator are reduced in intensity by a large leakage flux. This large leakage flux results from the constructional feature which requires the coils of these prior art instruments to have a diameter large compared to their length in order that the coils may be positioned one within the other so as to position their axes at right angles.

In the remote indicator of my invention, a single magnetized rotor is mounted so as to remain entirely within the solenoid field producing means and within a region therein where the flux density is uniform and at its maximum value. Consequently, the rotor is at all times in a field of maximum intensity and uniformity.

The type of remote indicator of the prior art, as illustrated in Fig. 3, is less accurate than the instrument of my invention when utilized in a similar manner because of the non-uniformity in flux density of the field traversed by the movable element. That is, since the coils are of a diameter large relative to their length, the flux density varies at all points within or outside of the coil. In the remote indicator of my invention, however, I am able to utilize a coil which produces a substantially uniform field thereby obtaining increased accuracy.

It is believed that the increase in accuracy and available torque which I have obtained result primarily from a new combination of parts which permit the use of a plurality of polarized rotor elements, each one being mounted entirely within a separate uniform field having its intensity and direction along a fixed axis variable by the transmitter. By utilizing at least two such rotor elements, positioned and coupled so that in a rest position the moment of force acting on one is equal in magnitude but opposite in sense to the moment of force acting on the other, the rotors may be made to rotate through 360° merely by changing the strength and direction of their respective fields.

This invention will be understood more readily from the following detailed description when considered in connection with the accompanying drawing and those features which are believed novel and patentable will be pointed out in the appended claims.

In the drawing:

Fig. 1 is a perspective view, partly in cross-section, of a preferred type of remote indicator of my invention;

Fig. 2 is a schematic view illustrating the principle of my invention; and

Fig. 3 is a schematic illustration of the type of prior art device to which reference has been made.

The prior art construction shown in Fig. 3, which is not my invention, consists of two coils 1 and 2 arranged at right angles to one another, a magnetized rotor 3, mounted on a spindle 4 which is free to rotate in the intersection of the plane of the coils 1 and 2 and which carries an indicating arm 5. The torque exerted by each coil on the rotor 3 tending to position the latter at right angles to the plane of the coil will be proportional to the product of the magnetic force of said coil H multiplied by the cosine of the angle of inclination $\theta$ of the magnet to the plane of the coil. In as much as the rotor 3 will occupy the position at any instant at which the torque exerted by one coil balances the torque exerted by the other coil, it follows, therefore, that if $\theta$ equals the angle of inclination of the rotor 3 to the plane of the coil 2 and $H_1$ is the magnetic force of coil 1 and $H_2$ the magnetic force of coil 2; then $$H_1 \cos \theta = H_2 \cos (90 - \theta)$$

$$\frac{H_1}{H_2} = \frac{\cos (90 - \theta_1)}{\cos \theta_1} = \frac{\sin \theta_1}{\cos \theta_1} = \tan \theta$$

Therefore the position of the rotor is coincident with the axis of the resultant field.

Because of the flux leakage, the flux density at any point inside or outside of the coil and along its axis varies and can be computed from the equation $$B = \frac{2\pi NI}{l}\left[\frac{0.5l+x}{\sqrt{r^2+(0.5l+x)^2}} + \frac{0.5l+x}{\sqrt{r^2+(0.5l-x)^2}}\right] \quad (1)$$

where $N$ is the total number of turns, $I$ the current in ab-amperes, $r$ the radius of the coil in centimeters, and $l$ the length of the coil in centimeters.

Likewise, it can be shown that for any point within the solenoid whether along the axis or not, provided that it be at a distance from the walls of the solenoid which is large in comparison with the diameter of the wire which forms the winding, the flux density varies and can be computed from the equation $$B = \frac{4\pi NI}{l}\left(1 - \frac{w_1+w_2}{4\pi}\right) \quad (2)$$

where $w_1$ and $w_2$ are the solid angles at the particular point $(p)$ subtended by the opposite ends of the coil.

In the case of a coil, or solenoid, whose length is great in comparison with its diameter, the sum of the solid angles $w_1$ and $w_2$ subtended by its ends become negligible in comparison with $4\pi$, thus the flux density becomes more nearly uniform or substantially equal to $$B = \frac{4\pi NI}{l} \quad (3)$$

This relation is not true for points near the ends of the solenoid since it can be shown by the Formula 2 above that approximately half as many lines of force pass through the end of a long solenoid as pass through its central cross-section. From a consideration of the above equations, it is apparent that the flux density in the coils of the repeater disclosed in Fig. 3 will not be uniform for all positions of the rotor. Consequently, the accuracy of the remote indicator and the available torque will be reduced.

The principle of my invention is illustrated schematically in Fig. 2 showing two equally magnetized rotor members 20 and 21 each supported on a shaft 22 so that the axes of each will form an angle of 90° with respect to each other. The magnets are also axially spaced along this shaft so that each may be completely enclosed within their respective coils 24 and 25 which surround each magnet. In the position illustrated, it is assumed that a current is flowing through the coils 24 and 25 in the indicated directions to produce a field intensity in each coil indicated by the arrow $H_1$ and $H_2$. The flux thus produced acts upon each magnetized rotor member tending to produce movement about its axis in the indicated direction. The moment of force acting on each magnet is equal to $$\text{Couple}_1 = H_1 ml \cos \theta_1$$
$$\text{Couple}_2 = H_2 ml \cos 90 - \theta_1$$

where $l$ = length of a magnet having a pole strength equal to $m$ and $\theta_1$ is the angle of inclination of the magnet 20 with the plane of the coil 24.

Since the couples are equal $$\frac{H_1}{H_2} = \frac{\cos 90 - \theta_1}{\cos \theta_1} = \frac{\sin \theta_1}{\cos \theta_1} \text{ or } \tan \theta_1$$

Since the field intensity of each magnet is proportional to its current, the magnets may be made to rotate through 360° merely by having the ratio of current in each coil vary as the tangent of an angle within the range of 0° to 360°.

A preferred modification of the repeating instrument of my invention as shown in Fig. 1 consists essentially of a frame 30 comprising an upper and lower plate 31 and 32 which supports the jeweled bearings 33 and 34 respectively. These plates are retained in an axially spaced position by the separator rods 35. A shaft 36 to which the compass card 37 and the permanent magnets 38 and 39 are each secured for rotation therewith is journaled in the bearings 33 and 34. Each of the magnets is mounted at an angle of 90° with respect to each other and as illustrated are shown positioned 45° each side of the axis of their respective differentially wound coils 42, 44 and 43, 45. Each pair of differentially wound coils are illustrated as being placed one inside the other, whereas, in actual construction, they are wound so that they will each have the same mean radius. These coils are secured to the frame and supported in a position wherein their axes are parallel.

In the modification illustrated, two concentric and differentially wound coils are provided to completely enclose each magnet. The purpose of using two differentially wound coils instead of a single coil, as shown in Fig. 2, is primarily one of convenience since only one of the differentially wound coils is energized for a single rotor position. The two coils do provide a convenient means for changing the direction of the field when the coils are energized from a transmitter of the type disclosed in my copending application Serial No. 423,359, filed December 17, 1941.

Thus when a repeater constructed in accordance with this invention is utilized with a transmitter of the type shown in my aforesaid application, one of the main coils of the upper set, such as coil 42, would be energized to influence magnet 38 over one half of its rotation and the other coil 44 energized to influence this magnet over the other half of its rotation. Similarly, coil 43 would be energized to influence magnet 39 over half of its rotation and coil 45 energized to influence this magnet over the other half of its rotation.

By utilizing a coil the length of which is large in comparison to the diameter, an intense field will be produced which is uniform through a considerable portion of its length. The requisites of good design limit the length of the coils, consequently, special measures are resorted to in order to make the field uniform over a fixed length along the axis of the coil.

It may be noted from the foregoing formula that the lines of force of a finite cylindrical coil diverge from the center outwardly toward the end surfaces; this divergence may be compensated for, however, by providing two symmetrical auxiliary ring-like windings for each of the differentially wound coils. As illustrated, the auxiliary ring-like windings 46 and 47 are positioned near the end of the coil 42 and are connected in series therewith; whereas, the ring-like coils 48 and 49 are positioned adjacent the opposite ends of the coil 44 and are also connected in series therewith. The auxiliary coils 46 and 47 are wound in the same direction as the coil 42. Likewise, the auxiliary ring-like windings 48 and 49 are wound in the same direction as the coil 44. The pair of differentially wound coils 43 and 45 are also shown provided with the compensating ring-like windings 46', 48' and 47', 49'. The coils 46' and 47' are wound in the same direction and are connected in series with coil 43. Auxiliary coils 48' and 49' are also wound in the same direction as coil 45 and connected in series with this coil.

The formula for computing the position and dimension of each of the coils is presented in an article by Von A. Buhl and F. Coeterier entitled "Production of uniform magnetic fields," published in Physikalische Zeitschrift, vol. 33, 1932, page 773. In an actual construction based upon the calculations involving the equations set out by Buhl and Coeterier, the auxiliary coils were placed eight centimeters on either side of the center of the main coil and were connected in series therewith. These auxiliary coils were wound with 450 turns and were used solely to create a more uniform field along the axes of the main coils. Calculations showed that when the current of 50 milliamperes flowed through the main coil and its two auxiliary coils in series, the field at the center was 28.12 gauss, while on the axis at a distance of 2 centimeters from the center, the field was 28.11 gauss.

The use of the auxiliary coils has in actual tests improved the accuracy of the remote indicator of my invention as much as 1° for some angular positions. By this it is understood that without a uniform field errors as large as 1° may exist. It can be shown by the formula presented in the publication referred to above that with a coil 40 cm. long and 6 cm. in diameter the field within a range of 10 cm. in length and 5 cm. in width is reduced less than 7/100,000 of the center point value. It is also worthy of note that uniformity outside the axis is attained at the same time as uniformity along the axis, so that in a given volume a uniform field is produced.

While I have shown in Fig. 1 the coils mounted with their axes parallel and the magnets at 90° to each other, I do not propose to be limited particularly to this construction. Obviously, other arrangements of coils and magnets could be used. However, I prefer the parallel arrangement of the coils since it permits use of the auxiliary coils 52, 54 and 53, 55, each pair being positioned concentrically with the main coils 42, 44 and 43, 45 respectively. These auxiliary coils are provided for the purpose of reducing mutual flux. As illustrated, coil 52 is wound so that the flux produced by the current flowing therethrough will oppose the direction of the flux produced by the coil 43. The number of turns of the coil 52 is selected so that its flux is equal in magnitude to the flux of the coil 43 which links the coils 42 or 44. The coil 52 when connected in series with the coil 43 is wound so that its flux is always equal and opposite to the flux produced by the coil 43 which links the coils 42 and 44. Likewise, coil 54 is wound so that the direction of its flux is opposite to the direction of the flux of coil 45 to which coil 54 is serially connected. Thus, the flux produced by the coil 54 will be substantially equal and opposite to the flux of the coil 45 which links the coils 42 and 44. Coil 53 is wound about coils 43 and 45 in a direction so as to oppose the flux of coil 42 which links coils 43 and 45. Coil 53 is connected in series with coil 42. The coil 55 is wound in a direction so that its flux produced by the current flowing through the coil 44 and the coil 55 which is connected in series therewith will oppose and counteract the stray flux of the coil 44 which links the turns of the coils 43 and 45. It will be noted, therefore, that by utilizing the parallel arrangement of the coils I am able by use of the auxiliary coils 52, 54 and 53, 55 to oppose the mutual flux of the main coils 42, 44 and 43, 45. Thus, the flux produced by the current flowing in a single one of the main coils will in no way affect the magnet positioned within another of the axially displaced main coils and the total resultant will be in a direct ratio with the current flowing in each coil.

In accordance with the provisions of the patent statutes, I have described a preferred embodiment of this invention with the understanding, however, that I am not to be limited particularly by the disclosure, since, obviously, numerous changes can be made in its constructional features. I do not propose, therefore, to be limited in any respect otherwise than within the scope of the subjoined claims.

The invention described and claimed herein may be manufactured and used by and for the Government of the United States of America for governmental purposes without the payment of any royalties thereon or therefor.

I claim:

1. An instrument for indicating angular positions as telemetered electrically from a transmitter unit, said instrument comprising a pair of solenoids each having a linear axis and producing a substantially uniform field along a portion of said axis, a polarized element supported within each solenoid for rotation about an axis normal to said linear axis and lying within the substantially uniform portion of its field, means coupling said polarized elements in a fixed position relative to each other, and an indicator element responsive to rotation of said polarized elements, said solenoids being adapted to be energized in predetermined directions and magnitude from said transmitter unit to thereby effect rotation of said polarized elements through 360°.

2. In an apparatus of the class described, the combination of a solenoid having a linear axis, a polarized body member supported for rotation completely within said solenoid, a second solenoid having a linear axis, a polarized body member supported for rotation completely within said second solenoid, and means coupling said polarized body members for unitary rotational movement so that the acute angle formed by the axis of the first solenoid and the polar axis of its rotor in the plane of rotation thereof plus the acute angle formed by the axis of the second solenoid and the polar axis of its rotor will for all positions of the rotor members equal 90°, the torques acting upon said body members in any position thereof being equal in magnitude but opposite in sense.

3. In an apparatus of the class described, the combination of a plurality of uniformly magnetized rotor members, a rotatable shaft having an indicator secured thereto for rotation therewith, means securing in spaced relation along said shaft each of said rotor members, means for producing a field having an axis parallel to the plane of rotation of a first one of said rotor members, said field having a uniform intensity within the space traversed by the said rotor, means for producing a field having an axis parallel to the plane of rotation of a second one of said rotor members, said field also having a uniform intensity throughout the space traversed by said rotor, the axes of the said fields produced by said means being arranged so that the moment of force produced by each field on its respective rotor member will be equal in magnitude but opposite in sense for all positions of rest of said rotor members, whereby the position of said indicator can be made to rotate through 360° by varying the strength and direction of said fields.

4. In an apparatus of the class described, the combination of two parallel spaced apart solenoids, a coaxial winding surrounding a first one of said solenoids adjacent each end thereof, said windings and said first solenoid being connected in series to produce a substantially uniform field throughout the space enclosed by said solenoid, a polarized body member having a linear axis supported for rotation in a portion of said field produced by said first solenoid and windings, a coaxial winding surrounding a second one of said solenoids adjacent each end thereof, said windings and said second solenoid being connected in series to produce a substantially uniform field, a polarized body supported for rotation in the portion of said field produced by said second solenoid and windings, and means mechanically coupling said rotatable body members so that the axis of each when projected on to the plane of rotation intersect at right angles, the torques acting upon said polarized bodies at any position thereof being equal in magnitude but opposite in sense.

5. The combination defined in claim 4 characterized further by the addition thereto of a means comprising an auxiliary coil positioned concentrically and centrally about each of said first and second solenoids, the auxiliary coil concentric with said first solenoid being wound oppositely to and connected in series with said second solenoid and its respective coaxial windings, the auxiliary coil concentric with said second solenoid being wound oppositely to and connected in series with said first solenoid and its respective coaxial windings whereby to counteract the mutual flux of said solenoids.

6. An instrument for indicating angular positions as telemetered electrically from a transmitter unit, said instrument comprising a pair of solenoids each having a linear axis and producing a substantially uniform field along a portion of said axis, a polarized element for each solenoid disposed within the substantially uniform portion of the solenoid's field, a rotatable shaft extending transversely through said solenoids, said polarized elements being secured to said shaft in a predetermined position relative to each other, and indicator means rotated by said shaft, said solenoids being adapted to be energized in predetermined directions and magnitude from said transmitter unit to thereby effect rotation of said polarized elements through 360°.

ADOLPH W. BORSUM.